United States Patent
Wang (10) Patent No.: US 12,231,603 B2
(45) Date of Patent: Feb. 18, 2025

(54) ECHO RESIDUAL SUPPRESSION

(71) Applicant: Dolby Laboratories Licensing Corporation, San Francisco, CA (US)

(72) Inventor: Ning Wang, Epping (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 154 days.

(21) Appl. No.: 17/911,529

(22) PCT Filed: Mar. 19, 2021

(86) PCT No.: PCT/US2021/023059
§ 371 (c)(1),
(2) Date: Sep. 14, 2022

(87) PCT Pub. No.: WO2021/194859
PCT Pub. Date: Sep. 30, 2021

(65) Prior Publication Data
US 2023/0138637 A1    May 4, 2023

Related U.S. Application Data (60) Provisional application No. 63/153,523, filed on Feb. 25, 2021, provisional application No. 62/993,149, filed on Mar. 23, 2020.

(51) Int. Cl.
*H04M 9/08* (2006.01)
*G10K 11/178* (2006.01)

(52) U.S. Cl.
CPC ....... *H04M 9/082* (2013.01); *G10K 11/17823* (2018.01); *G10K 11/17854* (2018.01)

(58) Field of Classification Search
CPC ........ H04M 3/002; H04M 9/082; H04B 3/23; G06F 17/00
USPC .... 379/406.1–406.1; 381/66, 93, 94.1, 94.3; 370/282–286; 455/570; 700/94
See application file for complete search history.

(56) References Cited

U.S. PATENT DOCUMENTS

| | | |
|---|---|---|
| 6,163,608 A | 12/2000 | Romesburg |
| 8,111,833 B2 | 2/2012 | Seydoux |
| 8,462,958 B2 | 6/2013 | Kuech |
| 8,712,076 B2 | 4/2014 | Dickins |
| 8,804,977 B2 | 8/2014 | Neal |
| 9,173,025 B2 | 10/2015 | Dickins |
| 9,185,506 B1 | 11/2015 | Deng |
| 9,338,551 B2 | 5/2016 | Thyssen |

(Continued)

FOREIGN PATENT DOCUMENTS

EP        1978649        10/2008

OTHER PUBLICATIONS

Chen, K. et al "An Improved Post-Filter of Acoustic Echo Canceller Based on Subband Implementation" Applied Acoustics, Elsevier publishing, vol. 70, No. 6, Jun. 1, 2009, pp. 886-893.

(Continued)

*Primary Examiner* — Alexander Krzystan (57) ABSTRACT

A method of audio processing includes calculating an estimated echo residual power based on a long-term amount of echo cancellation as indicated by an estimated power gain profile, where the estimated power gain profile is based on a reference signal and an echo residual signal. Echo suppression of the echo residual may then be performed based on the estimated echo residual power.

20 Claims, 5 Drawing Sheets

(56) References Cited

U.S. PATENT DOCUMENTS

| | | | |
|---|---|---|---|
| 9,363,600 B2 | 6/2016 | Yang | |
| 9,420,390 B2 | 8/2016 | Eriksson | |
| 9,503,815 B2 | 11/2016 | Ramprashad | |
| 10,115,411 B1 | 10/2018 | Chu | |
| 10,313,789 B2 | 6/2019 | Ushakov | |
| 10,382,092 B2 | 8/2019 | Khanduri | |
| 10,477,031 B2 | 11/2019 | Schalk-Schupp | |
| 10,602,270 B1* | 3/2020 | Sørensen | G10L 21/0208 |
| 2009/0281805 A1* | 11/2009 | LeBlanc | G10L 21/0208 |
| | | | 704/E15.039 |
| 2014/0126745 A1* | 5/2014 | Dickins | H04R 1/1083 |
| | | | 381/94.3 |
| 2016/0241955 A1 | 8/2016 | Thyssen | |
| 2019/0349471 A1 | 11/2019 | Ferguson | |
| 2020/0336171 A1* | 10/2020 | Wu | H04B 3/32 |
| 2021/0249029 A1* | 8/2021 | Hines | H04R 27/00 |
| 2023/0138637 A1* | 5/2023 | Wang | H04M 9/082 |
| | | | 379/406.08 |

OTHER PUBLICATIONS

Yemdji, C. et al "Efficient Low Delay Filtering for Residual Echo Suppression" 18th European Signal Processing Conference, Aug. 2010, pp. 16-20.

* cited by examiner

ECHO RESIDUAL SUPPRESSION

CROSS REFERENCE TO RELATED APPLICATIONS

This application is a U.S. national stage application under 35 U.S.C. § 371 of International Application No. PCT/US2021/023059, filed on Mar. 19, 2021, which claims priority to U.S. Provisional Patent Application 62/993,149, filed Mar. 23, 2020 and U.S. Provisional Patent Application 63/153,523, filed Feb. 25, 2021, each of which is hereby incorporated by reference in its entirety.

FIELD

The present disclosure relates to audio processing, and in particular, to echo suppression.

BACKGROUND

Unless otherwise indicated herein, the approaches described in this section are not prior art to the claims in this application and are not admitted to be prior art by inclusion in this section.

A telecommunications device such as an audio conferencing system generally includes both a loudspeaker and a microphone. The two parties in a communication may be referred to as the near end party and the far end party. The near end party is proximal to a first telecommunications device, and the far end party is at a different location than the near end party and communicates using a second telecommunications device via a wired or wireless telecommunications network. The microphone of the near end device captures not only the speech of the near end party, but may also capture the speech of the far end party that has been output from the loudspeaker at the near end. The output from the loudspeaker that is captured by the microphone is generally referred to as echo. The near end telecommunications device generally includes an echo management system for reducing the echo prior to transmitting the audio captured at the near end to the far end.

The echo management system generally includes an echo cancellation system followed by an echo suppression system. The echo cancellation system is a linear system and typically may include an adaptive filter. The echo remaining in the audio signal after echo cancellation is generally referred to as the "echo residual". The echo suppression system is a nonlinear system that applies additional attenuation to the audio signal in order to reduce the echo residual. The attenuation performed by the echo suppression system is referred to as non-linear in that it may apply different gains to different frequencies or frequency bands.

Telecommunications devices generally implement approximately an aggregate 50 dB of echo reduction based on the contributions of the physical echo return loss (e.g., due to the distance between the loudspeaker and the microphone), the echo cancellation and the echo suppression.

SUMMARY

One issue with existing echo management systems is that laptop computers are increasingly used for telecommunications, such as audioconferencing or videoconferencing. In a laptop computer, the loudspeaker and microphone are in close proximity, making it difficult to achieve the target of 50 dB for echo reduction. Given the above, there is a need to improve the echo suppression system in order to reduce the echo residual.

According to an embodiment, a computer-implemented method of audio processing includes receiving a reference signal and an echo residual signal. The method further includes generating a banded reference signal and a banded echo residual signal by performing banding on the reference signal and the echo residual signal, respectively. The method further includes calculating an estimated power gain profile and a loopback power based on the banded reference signal and the banded echo residual signal. The method further includes calculating an estimated echo residual power based on the banded echo residual signal, the loopback power and the estimated power gain profile. The method further includes calculating a plurality of banded gains based on the banded echo residual signal and the estimated echo residual power. The method further includes generating a modified echo residual signal by applying the plurality of banded gains to the echo residual signal.

According to another embodiment, an apparatus includes a loudspeaker, a microphone, and a processor. The processor is configured to control the apparatus to implement one or more of the methods described herein. The apparatus may additionally include similar details to those of one or more of the methods described herein.

According to another embodiment, a non-transitory computer readable medium stores a computer program that, when executed by a processor, controls an apparatus to execute processing including one or more of the methods described herein.

The following detailed description and accompanying drawings provide a further understanding of the nature and advantages of various implementations.

DETAILED DESCRIPTION

Described herein are techniques related to echo suppression. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

This document describes various processing functions that are associated with structures such as blocks, elements, components, circuits, etc. In general, these structures may be implemented by a processor that is controlled by one or more computer programs.

A brief overview describing various embodiments for echo management is as follows. The system first estimates the echo residual power in each band of the input signal by modeling the power gain of the echo canceller for each band as a Gaussian distributed random variable, the mean and variance of which depend on the loopback power and a gain profile estimation. Next, the system estimates the statistical gain profile for each band and for each different input level. The system uses the statistical gain profile to quantize the input level into several segments. Next, the system models the wideband echo residual as a Gaussian mixture model, and calculates the likelihood of local talk. Finally, depending on the likelihood of local talk, the system applies different maximum suppressions to the bands of the input signal. Further details are provided below.

Figure 1:
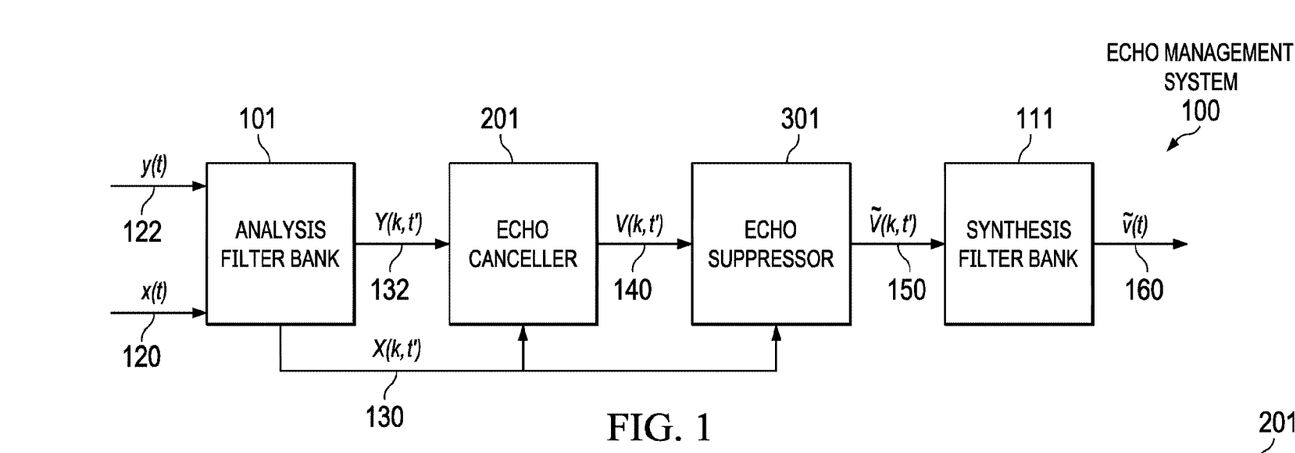
FIG. 1 is a block diagram of an echo management system 100.

FIG. 1 is a block diagram of an echo management system 100. The echo management system 100 generally removes echo from the audio captured by the near end device prior to transmission to the far end device. For example, when the audio from the far end is received by the near end device and is outputted by the loudspeaker of the near end device, the "echo" corresponds to this output from the loudspeaker that is captured by the microphone of the near end device. The echo management system 100 includes an analysis filter bank 101, an echo canceller 201, an echo suppressor 301, and a synthesis filter bank 111.

The analysis filter bank 101 receives a reference signal 120 (also denoted as x(t)) and a captured signal 122 (also denoted as y(t)), performs a transform, and generates a transformed reference signal 130 (also denoted as X(k, t')) and a transformed captured signal 132 (also denoted as Y(k, t')). The reference signal 120 corresponds to the signal received from the far end device that is output by the loudspeaker of the near end device. The captured signal 122 corresponds to the audio captured by the microphone of the near end device, which may include local talk (e.g., the speech of a person associated with the near end device) as well as the echo of the output of the loudspeaker (e.g., the speech of a person associated with the far end device).

The transform generally corresponds to transforming an input signal from one domain to another domain (e.g., a time domain to frequency domain transform). The analysis filter bank 101 performs filtering and decimation of the reference signal 120 and the captured signal 122 to generate the transformed reference signal 130 and the transformed captured signal 132. For example, the analysis filter bank 101 performs filtering and decimation of x(t) to generate X(k, t'), where k indicates the sub-band filter index and t' indicates the new time variable after decimation. Similarly, the analysis filter bank 101 performs filtering and decimation of y(t) to generate Y(k, t').

The parameter k may be adjusted as desired to adjust the fineness of the transform bins for a given input signal bandwidth. For example, common bandwidths of the reference signal 120 (or the captured signal 122) may be 4 kHz, 8 kHz, 12 kHz, 16 kHz, 24 kHz, etc., with corresponding sampling rates of 8 kHz, 16 kHz, 24 kHz, 32 kHz, 48 kHz, etc. For a transform bin bandwidth of 25 Hz, k may be 160 bins for a 4 kHz signal, 960 bins for a 24 kHz signal, etc. when performing the transform (e.g., a fast Fourier transform).

The echo canceller 201 receives the transformed reference signal 130 and the transformed captured signal 132, performs echo cancellation, and generates an echo residual signal 140 (also denoted as V(k, t')). In general, echo cancellation refers to applying a linear filtering to Y(k, t') based on X(k, t') to generate V(k, t'). The echo canceller 201 typically implements an adaptive filter. Further details of the echo canceller 201 are provided with reference to FIG. 2. The echo residual signal 140 is referred to as the "echo residual signal" because it results from applying echo cancellation to the transformed captured signal 132; the remaining echo in the signal after echo cancellation, and prior to echo suppression, is "residual echo".

The echo suppressor 301 receives the transformed reference signal 130 and the echo residual signal 140, performs echo suppression, and generates a modified echo residual signal 150 (also denoted as $\tilde{V}$(k, t')). In general, echo suppression refers to applying a non-linear attenuation to V(k, t') based on X(k, t') to generate the modified echo residual signal $\tilde{V}$(k, t') as a suppressed signal. Further details of the echo suppressor 301 are provided with reference to FIG. 3.

The synthesis filter bank 111 receives the modified echo residual signal 150, performs an inverse transform, and generates a modified captured signal 160 (also denoted as $\tilde{v}$(t), which is a time domain signal). The inverse transform generally corresponds to an inverse of the transform performed by the analysis filter bank 101. The modified captured signal 160 may then be transmitted from the near end device to the far end device.

For the echo management system 100, the echo can be modeled as applying a linear filter to the playback signal, for example using Equation (1):

$$\hat{x}(t) = h(t) * x(t) + n(t) \quad (1)$$

In Equation (1), $\hat{x}$(t) corresponds to the echo to be canceled out, h(t) corresponds to a model of the speaker-room-microphone impulse response (of the room in which the near end device with the speaker and microphone is located), x(t) corresponds to the reference signal 120, and n(t) corresponds to noise.

When there is no uplink voice (e.g., no local talk at the near end, and the microphone captures only the echo of the loudspeaker output; uplink voice may also be referred to as near end voice), we have Equation (2):

$$y(t) = h(t) * x(t) + n(t) \quad (2)$$

In Equations (1) and (2), h(t) may be estimated by various techniques, including a least mean squares (LMS) process, a normalized least mean squares (NLMS) process, a recursive least squares (RLS) process, etc.

Due to the acoustic nature, a typical room impulse response has more than thousands taps, and the adaptive filter thus will require a large amount of computation resources. This is highly undesirable for laptop and desktop computers, and the filter bank 101 is used to implement a sub-band adaptive filter to reduce the computation.

Figure 2:
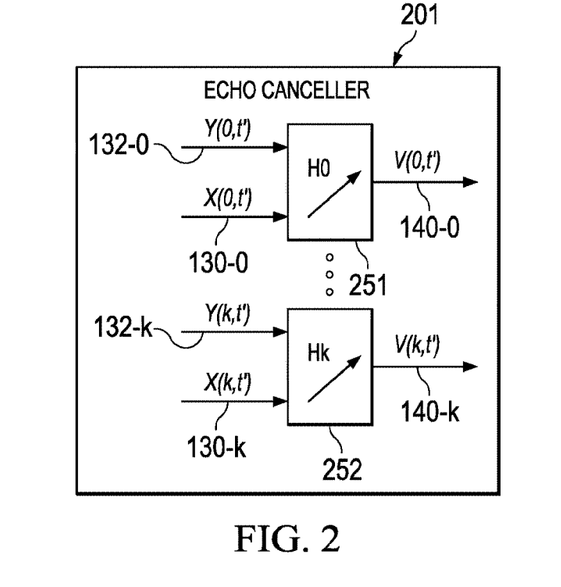
FIG. 2 is a block diagram of the echo canceller 201 (see FIG. 1).

FIG. 2 is a block diagram of the echo canceller 201 (see FIG. 1). The echo canceller 201 includes a plurality of adaptive filters (e.g., k adaptive filters) corresponding to the number of analysis bins. Two adaptive filters 251 and 252 are shown. The adaptive filter 251 receives X(0, t') and Y(0, t'), applies an adaptive filter $H_0$, and generates V(0, t'). The adaptive filter 252 receives X(k, t') and Y(k, t'), applies an adaptive filter $H_k$, and generates V(k, t'). The other adaptive filters in the echo canceller 201 that are not shown generate the remaining k−1 components. X, Y, and V respectively correspond to the transformed reference signal 130, the transformed captured signal 132, and the echo residual signal 140 (see FIG. 1), with the signals corresponding to the respective bins being denoted with a suffix corresponding to the bin (e.g., "130-0" for the 0-th bin of the reference signal 130, "**130-*k*"** for the k-th bin, etc.). The filter response H corresponds to the room impulse response h(t) in the transform domain.

Although the sub-band adaptive filter implemented by the filter bank 101 can greatly reduce the complexity of the algorithm, the performance of the echo canceller 201 is degraded because of the spectrum overlap between filters. A closed-loop sub-band adaptive filter is proposed to alleviate the problem, but due to the fact that complexity is largely increased, the open-loop sub-band adaptive filter FIG. 2 is still a commonly adopted technique for acoustic echo cancelation.

Figure 3:
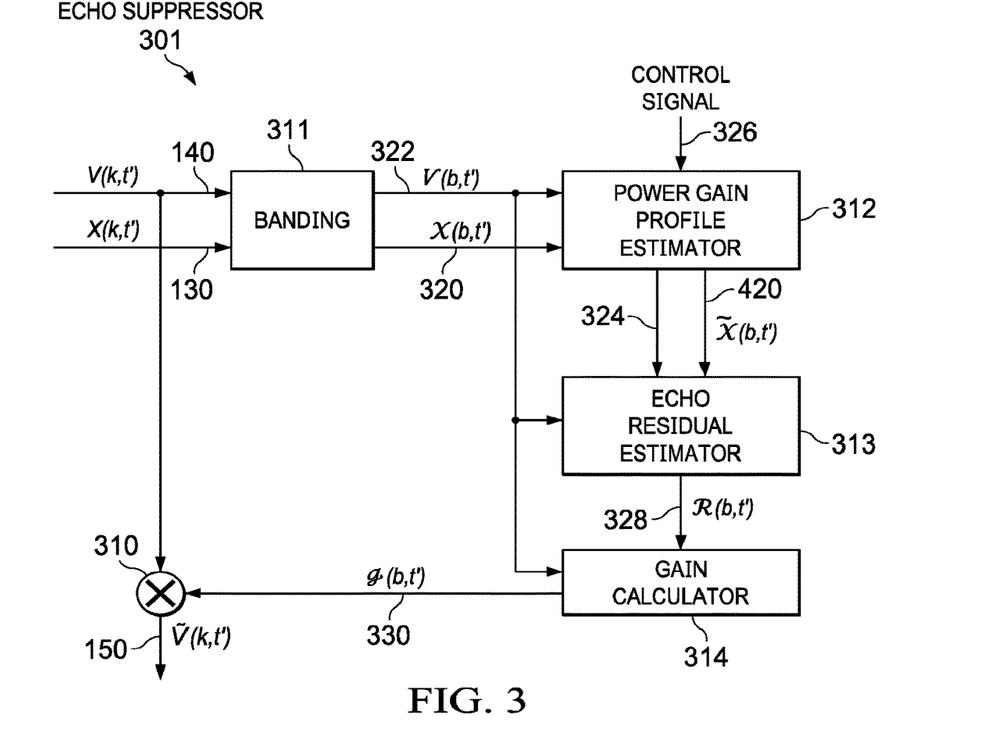
FIG. 3 is a block diagram of the echo suppressor 301 (see FIG. 1).

FIG. 3 is a block diagram of the echo suppressor 301 (see FIG. 1). As mentioned above, an open-loop sub-band adaptive filter is a practical (but not an adequate) solution to cancel echo to the amount of 50 dB to enable a good experience of voice communication. Even though most of the time during a voice call, full duplex communication (e.g., double talk, when both ends are talking) happens rarely, and when it happens, none of the active speakers will expect to understand the other party's speech; instead, their intention is merely to interrupt. Based on this, a nonlinear echo suppression can be applied after echo cancellation to further suppress echo but to allow the uplink voice of the near end party to interrupt the far end party.

Having that in mind, during a multi-end call with three participants, the third party (who is not the active two talkers in the duplex scenario) will have a bad experience if the suppressor lets through too much of the echo residual, even though the person being interrupted might not. Thus, a good suppressor shall suppress as much as possible of the echo residual while passing through as much as possible of the uplink voice. This goal is only possible, for a linear operation, by an adaptive filter such as the echo canceller 201.

To address these issues and to provide additional echo management, the echo suppressor 301 uses the intrinsic statistics of the echo residual to perform echo suppression. The echo suppressor 301 includes a banding component 311, a power gain profile estimator 312, an echo residual estimator 313, a gain calculator 314, and a signal combiner 310.

The banding component 311 receives the transformed reference signal 130 (also denoted as X(k, t')) and the echo residual signal 140 (also denoted as V(k, t')), performs frequency banding, and generates a banded reference signal 320 (also denoted as $\mathcal{X}$(b, t')) and a banded echo residual signal 322 (also denoted as $\mathcal{V}$(b, t')). In general, "banding" refers to grouping or aggregating multiple sub-bands or frequency bins of a signal to form a band, where the resulting number of bands is less than the original number of sub-bands or frequency bins. For example, the banding may be performed by summing multiple sub-bands or frequency bins to form a band, and may include additional operations such as multiplication, absolute value calculation, magnitude calculation, etc. The banding component 311 may perform banding of the echo residual signal 140 to generate the banded echo residual signal 322 according to Equation (3):

$$\mathcal{V}(b, t') = \sum_{k \in B(b)} |V(k, t')|^2 \qquad (4)$$

The banding component 311 may perform banding of the transformed reference signal 130 to generate the banded reference signal 320 according to Equation (4):

$$\mathcal{X}(b, t') = \sum_{k \in B(b)} |X(k, t')|^2 \qquad (4)$$

In Equations (3) and (4), B (b) corresponds to a set of bins k that are associated with a band b, and the output of the banding corresponds to the signal power for each particular band. The banding may be equivalent rectangular bandwidth (ERB) banding, which corresponds to a psychoacoustic model of human hearing and associates larger bandwidths with lower frequencies. For example, the number of bins k may be 960 bins, the number of bands b may be 61, and each band b is associated with a number of the bins k, where more bins are associated with the lower frequency bands than with the higher frequency bands.

Figure 4:
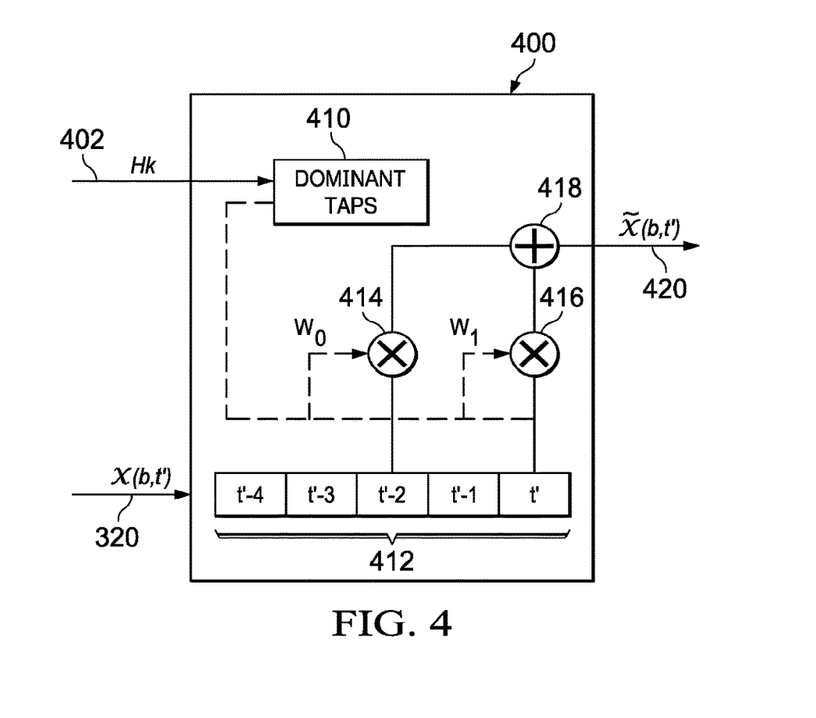
FIG. 4 is a block diagram of a loopback power calculator 400.

The power gain profile estimator 312 receives the banded reference signal 320 and the banded echo residual signal 322, estimates a power gain profile, and generates an estimated power gain profile 324 and a loopback power 420 (also denoted as $\widetilde{\mathcal{X}}$ (b, t'); see FIG. 4). The estimated power gain profile 324 corresponds to an estimate of the power gain profile of an acoustic echo canceller such as the echo canceller 201 (see FIG. 1). The power gain profile estimator 312 may also receive a control signal 326 that indicates the presence of double talk. Double talk refers to the situation of when both the far end party and the near end party are speaking at the same time (e.g., where the far end speech is indicated according to the reference signal 120 and the near end speech is indicated by the captured signal 122, which also includes the echo of the far end speech outputted by the loudspeaker and captured by the microphone at the near end).

When the echo canceller 201 reaches steady state, and when there is no uplink voice (e.g., indicated by no double talk according to the control signal 326, and the presence of echo according to the reference signal 120), we will have the echo residual signal 140 (also denoted as V(k, t')) as represented according to Equation (5):

$$V(k,t')=X(k,t')*[\hat{H}(k,t)-H(k,t)] \qquad (5)$$

In Equation (5), Ĥ(k, t)−H(k, t) is the error response of the adaptive filter not matching the real speaker-room-mic response. Notice that because Ĥ(k, t') depends on the input X(k, t), H̃(b, t') will also depend on the input. And because the adaptive filter Ĥ(k, t) has multiple taps, the current residual power $\mathcal{V}$(b, t') might not only depend on the current input power, but also on previous input power. In other words, echo residual V(k, t') will not be a linear time invariant (LTI) system output.

For simplicity and practical implementation, we model the power of the residual according to Equation (6):

$$\mathcal{V}_{(b,t')} = \tilde{\mathcal{X}}_{(b,t')} \cdot \tilde{H}_{(b,t')} \tag{6}$$

Figure 5:
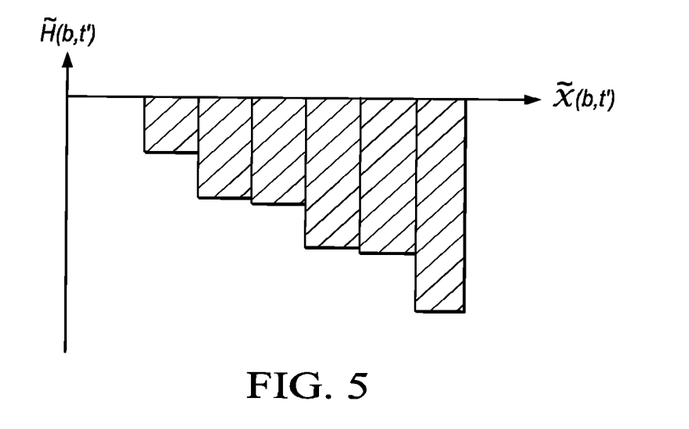
FIG. 5 is a histogram of the relationship between the loopback power $\tilde{X}(b, t')$ and the error (echo residual) transfer function $\tilde{H}(b, t')$ of the adaptive filter.

Additional details of the power gain profile estimator 312 are provided in FIGS. 4-5.

FIG. 4 is a block diagram of a loopback power calculator 400. The loopback power calculator 400 may be a component of the power gain profile estimator 312 (see FIG. 3). The loopback power calculator 400 generally calculates the loopback power 420 (also denoted as $\tilde{\mathcal{X}}$(b, t'); see also FIG. 3) of the banded reference signal 320 (see FIG. 3; also denoted as $\mathcal{X}$(b, t')). In general, the loopback power 420 corresponds to a weighted combination of historical values of the banded reference signal 320, as more fully detailed below. The loopback power calculator 400 includes a dominant adaptive filter tap finder 410, a memory 412, multipliers 414 and 416, and an adder 418.

The dominant adaptive filter tap finder 410 receives filter coefficients 402 (corresponding to the filter coefficients of the adaptive filters $H_k$ in the echo canceller 201 of FIG. 2), determines the two dominant taps, and provides the weights $w_0$ and $w_1$ of the dominant taps to the multipliers 414 and 416. A dominant tap is a tap that provides a greater weight contribution to the adaptive filter than another tap. The dominant adaptive filter tap finder 410 uses the filter coefficients 402 corresponding to $H_k$ across all the sub-bands. The weights $w_0$ and $w_1$ may be relative weights.

The memory 412 stores a history of the banded reference signal $\mathcal{X}$(b, t'). The memory 412 has several memory elements, to store the current values of the banded reference signal $\mathcal{X}$(b, t') and one or more previous values of the banded reference signal $\mathcal{X}$(b, t'−1), $\mathcal{X}$(b, t'−2), ..., $\mathcal{X}$(b, t'−n). As a specific example, FIG. 2 shows the memory 412 containing 4 memory elements.

The multiplier 414 multiplies one of the historical values of the banded reference signal 320 stored in the memory 412 by the weight $w_0$, and the multiplier 416 multiplies another of the historical values of the banded reference signal 320 stored in the memory 412 by the weight $w_1$. The adder 418 adds the results of the multipliers 414 and 416. As a result, the loopback power $\tilde{\mathcal{X}}$(b, t') may be calculated according to Equation (7):

$$\tilde{\mathcal{X}}_{(b,t')} = w_0 \mathcal{X}_{(b,t'-n_0)} + w_1 \mathcal{X}_{(b,t'-n_1)} \tag{7}$$

In Equation (7), $n_0$ and $n_1$ are the delay indices respectively corresponding to the dominant taps $w_0$ and $w_1$. In the example shown in FIG. 4, $n_0$ is 2 and $n_1$ is 0.

When the input power is larger in a particular band (as corresponding to the loopback power $\tilde{\mathcal{X}}$(b, t')), H̃(b, t') also tends to be larger in absolute value. This relationship is further detailed in FIG. 5.

FIG. 5 is a histogram of the relationship between the loopback power $\tilde{\mathcal{X}}$(b, t') (also referred to as the loopback power 420 in FIGS. 3-4) and the error (echo residual) transfer function H̃(b, t') of the adaptive filter. As can be seen from FIG. 5, when the input power is larger in a particular band (as corresponding to the loopback power $\tilde{\mathcal{X}}$(b, t') in a particular band), H̃(b, t') also tends to be larger in absolute value. On the other hand, when the band contains mainly noise, H̃(b, t') tends to be small as the noise will not be cancelled.

Returning to FIG. 3, the power gain profile estimator 312 uses the relationship of FIG. 5 as a histogram to estimate a gain profile for each band. The estimated power gain profile 324 may be represented as the mean μ(b, t') and variance σ²(b, t') of H̃(b, t'). (The mean and variance are denoted as $\mu_b$ and $\sigma_b^2$ in the following paragraphs, for simplicity.) In summary, the power gain profile estimator 312 uses the statistics of the echo residual signal (e.g., the echo residual signal 140) in combination with the history of the input signal (e.g., the reference signal 130) to estimate the power gain profile.

The power gain profile estimator 312 uses the control signal 326 (e.g., the double talk indicator) to update the gain profile. Specifically, the power gain profile estimator 312 updates the gain profile only when it has confidence that there is no uplink (near end) voice, as indicated by the control signal 326. The control signal 326 may be generated in various ways, including by a double talk detector or using a stochastic method. An example of the stochastic method is to update the estimation at a random time once the reference signal has exceeded a first threshold for a duration longer than a second threshold.

The echo residual estimator 313 receives the banded echo residual signal 322 (also denoted as $\mathcal{V}$(b, t')), the loopback power 420 (also denoted as $\tilde{\mathcal{X}}$(b, t')) and the estimated power gain profile 324 (the mean and variance of H̃(b, t'), denoted as $\mu_b$ and $\sigma_b^2$), and calculates an estimated echo residual power 328 (also denoted as $\mathcal{R}$(b, t')). The echo residual estimator 313 may calculate the estimate echo residual power 328 based on a combination of the estimated power gain profile 324 and the loopback power 420. The echo residual estimator 313 may calculate the estimate echo residual power 328 using a minimum operator applied to a combination of the banded echo residual signal 322, the loopback power 420 and the estimated power gain profile 324. The echo residual estimator 313 may calculate the estimated echo residual power 328 according to Equation (8):

$$\mathcal{R}_{(b,t')} = \min\{\mathcal{V}_{(b,t')}, (\mu_b + \beta\sigma_b^2) \cdot \tilde{\mathcal{X}}_{(b,t')}\} \tag{8}$$

In Equation (8), β is a factor determined by tuning. The minimum operator ensures that the estimated echo residual power 328 will never exceed $\mathcal{V}$(b, t'), which is a composite of the echo residual power and the local talk power. The estimated echo residual power 328 may be modeled as a Gaussian random variable with its centroid at $\mathcal{R}$(b, t'). In summary, the echo residual estimator 313 calculates the estimated echo residual power 328 according to the loopback power 420 for each band, by modeling the power gain of the echo canceller 201 (see FIGS. 1-2) for each band as a Gaussian random variable parameterized by the estimated power gain profile 324.

The gain calculator 314 receives the banded echo residual signal 322 and the estimated echo residual power 328, and calculates banded gains 330 (also denoted as $\mathcal{G}$(b, t')). One goal of calculating the banded gains 330 is to apply, to each particular band, different amounts of suppression for the half duplex scenario versus the full duplex scenario. (The half duplex scenario describes when only one party is talking, e.g. either the near end or the far end. The full duplex scenario describes when both parties are talking, e.g. double talk.) In other words, calculating the banded gains 330 includes selectively calculating the plurality of banded gains based on a likelihood of local talk in the echo residual signal. As part of calculating the banded gains 330, the gain calculator 314 calculates a feature to steer the gain calculation between the two scenarios.

Due to the nature of room noise, electronic noise, and randomness of the voice signal, it is assumed that the estimated echo residual power 328 in dB has a Gaussian distribution with mean dB$\{\mathcal{R}(b, t')\}$ and variance $\sigma_b^2$, which corresponds to the estimated power gain profile 324 calculated by the power gain profile estimator 312. It is also assumed that the estimated echo residual power 328 in dB has no cross-correlation (with the first assumption, independent) between bands. Let $E^c$ be the event when there is no uplink voice; the probability density function for echo residual power in dB a particular band is given by Equation (9):

$$Pr(x|E^c) \propto e^{-\frac{(x-dB\{\mathcal{R}(b,t')\})^2}{\sigma_b^2}} \quad (9)$$

In Equation (9), x is the estimated echo residual power 328 in dB, and $\mathcal{R}$(b, t') corresponds to the centroid of the estimated echo residual power 328.

Figure 6:
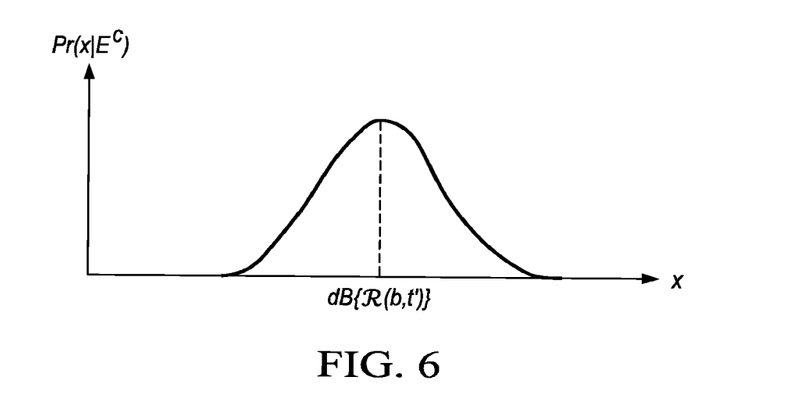
FIG. 6 is a graph that illustrates the probability density function $Pr(x|E^c)$.

FIG. 6 is a graph that illustrates the probability density function Pr(x|$E^c$) of Equation (9). In FIG. 6, the x-axis corresponds to x and the y-axis corresponds to Pr(x|$E^c$).

By modeling the wideband echo residual as a Gaussian mixture model, the log likelihood L of no uplink voice across all bands b is given by Equation (10):

$$L = \sum_b -\frac{(dB\{\mathcal{V}(b, t')\} - dB\{\mathcal{R}(b, t')\})^2}{\sigma_b^2} \quad (10)$$

In Equation (10), the log likelihood L is the sum over all bands b of the exponential component $$-\frac{(dB\{\mathcal{V}(b, t')\} - dB\{\mathcal{R}(b, t')\})^2}{\sigma_b^2}$$

from Equation (9). In other words, the likelihood of local talk in the echo residual signal 140 is a log likelihood based on a mean and a variance of the estimated power gain profile summed over a plurality of frequency bands. In summary, the log likelihood L is calculated by modeling the echo residual signal 140 as a Gaussian mixture model applied over all the bands b.

When there is no uplink voice (e.g., no local talk captured by the device), L($E^c$) should be low; otherwise L(E) is high, and the log likelihood L of Equation (10) will be the signal to steer the gain calculation.

The log likelihood L of Equation (10) is used to calculate a global maximum suppression gain across all bands $G_{max}$ according to Equation (11):

$$G_{max}(dB) = \begin{cases} G_0 + \frac{G_1 - G_0}{1 + (L - L_{th})^2}, & \text{when } L \geq L_{th} \\ G_1, & \text{otherwise} \end{cases} \quad (11)$$

In Equation (11), $G_0$ is the gain in dB when there is uplink voice, and $G_1$ is the predefined gain in dB when there is no uplink voice. $L_{th}$ is a pre-defined threshold, which can be obtained for each device during initial setup via prior knowledge of whether local talk presents or not.

In other words, calculating the banded gains 330 includes calculating a global maximum suppression gain $G_{max}$ across the plurality of frequency bands. The global maximum suppression gain is based on a first gain $G_0$ corresponding to a presence of the local talk, a second gain $G_1$ corresponding to an absence of the local talk, and the likelihood L of the local talk.

Across each band, the gain calculator 314 may calculate the gain for each band $\mathcal{G}$(b, t') using one or more gain calculation processes. Example gain calculation processes that are suitable include the gain calculation processes described in U.S. Pat. Nos. 9,173,025, 8,712,076, and 8,804,977, which are incorporated herein by reference.

The signal combiner 310 receives the echo residual signal 140 (also denoted as V(k, t')) and the banded gains 330 (also denoted as $\mathcal{G}$(b, t')) and generates a modified echo residual signal 150 (also denoted as $\tilde{V}$(k, t')). The gain calculated for a given band b is applied to all of the sub-bands k that belong to that given ERB band. The signal combiner 310 may generate the modified echo residual signal 150 according to Equation (12):

$$\tilde{V}(k, t') = \sum_{k \in B(b)} \mathcal{G}(b, t') V(k, t') \quad (12)$$

In other words, the echo residual signal 140 has a number of frequency bins k, where a given banded gain $\mathcal{G}$(b, t') of the banded gains 330 corresponds to a given frequency bin (e.g., each band b may be associated with a number of bins k), and generating the modified echo residual signal 150 includes, for each of the bins k of the echo residual signal 140, applying a corresponding banded gain $\mathcal{G}$(b, t') to generate the modified echo residual signal 150.

Figure 7:
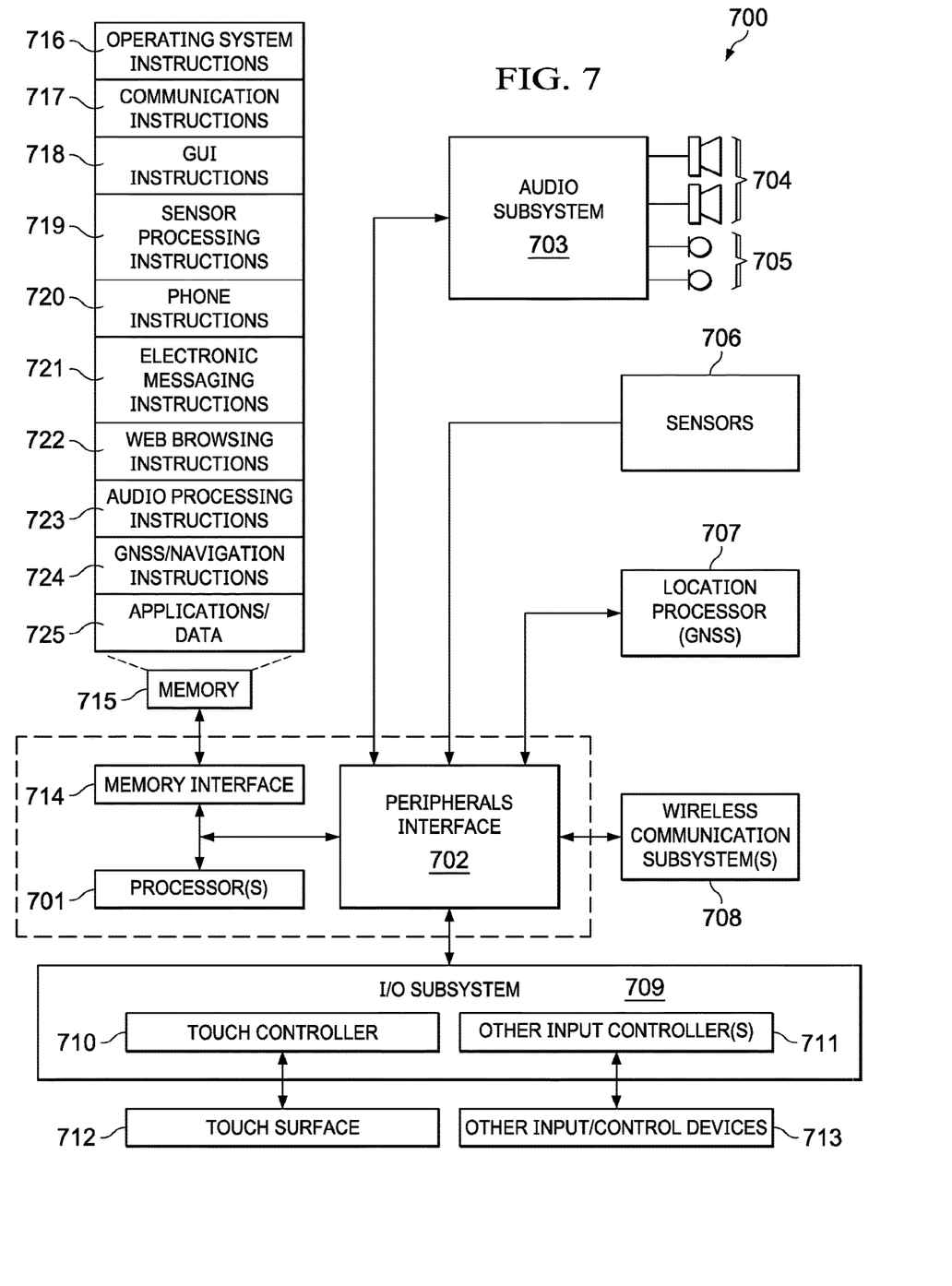
FIG. 7 is a mobile device architecture 700 for implementing the features and processes described herein, according to an embodiment.

FIG. 7 is a mobile device architecture 700 for implementing the features and processes described herein, according to an embodiment. The architecture 700 may be implemented in any electronic device, including but not limited to: a desktop computer, consumer audio/visual (AV) equipment, radio broadcast equipment, mobile devices (e.g., smartphone, tablet computer, laptop computer, wearable device), etc., In the example embodiment shown, the architecture 700 is for a laptop computer and includes processor(s) 701, peripherals interface 702, audio subsystem 703, loudspeakers 704, microphone 705, sensors 706 (e.g., accelerometers, gyros, barometer, magnetometer, camera), location processor 707 (e.g., GNSS receiver), wireless communications subsystems 708 (e.g., Wi-Fi, Bluetooth, cellular) and I/O subsystem(s) 709, which includes touch controller 710 and other input controllers 711, touch surface 712 and other input/control devices 713. Other architectures with more or fewer components can also be used to implement the disclosed embodiments.

Memory interface 714 is coupled to processors 701, peripherals interface 702 and memory 715 (e.g., flash, RAM, ROM). Memory 715 stores computer program instructions and data, including but not limited to: operating system instructions 716, communication instructions 717, GUI instructions 718, sensor processing instructions 719, phone instructions 720, electronic messaging instructions 721, web browsing instructions 722, audio processing instructions 723, GNSS/navigation instructions 724 and applications/data 725. Audio processing instructions 723 include instructions for performing the audio processing described herein.

Figure 8:
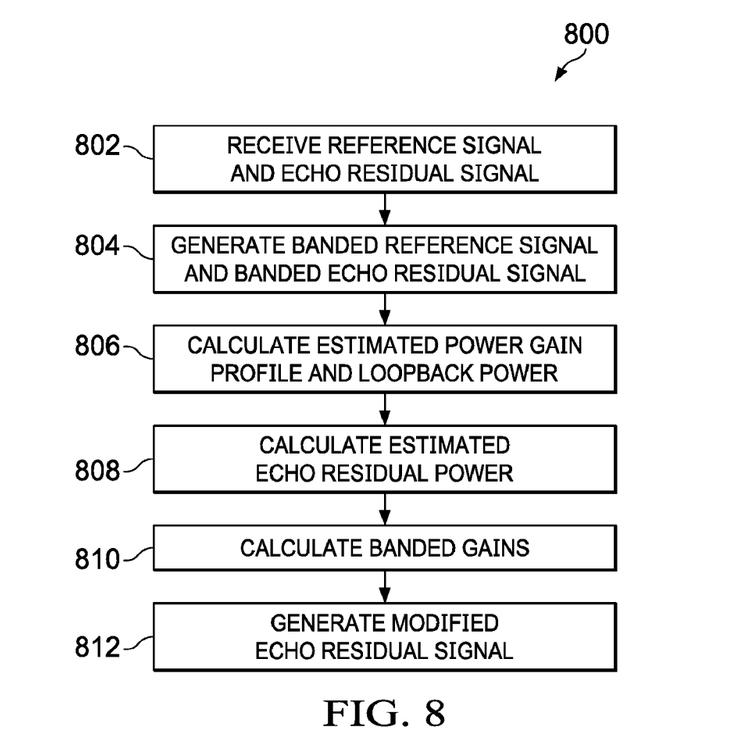
FIG. 8 is a flowchart of a method 800 of audio processing.

FIG. 8 is a flowchart of a method 800 of audio processing. The method 800 may be performed by a device (e.g., a laptop computer, a mobile telephone, etc.) with the components of the architecture 700 of FIG. 7, to implement the functionality of the echo management system 100 (see FIG. 1), the echo canceller 201 (see FIG. 2), the echo suppressor 301 (see FIG. 3), the loopback power calculator 400 (see FIG. 4), etc., for example by executing one or more computer programs.

At 802, a reference signal and an echo residual signal are received. For example, the echo suppressor 301 (see FIG. 3) may receive the transformed reference signal 130 and the echo residual signal 140. The transformed reference signal 130 corresponds to the reference signal 120, as can be seen in FIG. 1.

At 804, a banded reference signal and a banded echo residual signal are generated by performing frequency banding on the reference signal and the echo residual signal. For example, the banding component 311 (see FIG. 3) may perform banding on the transformed reference signal 130 and the echo residual signal 140 to generate the banded reference signal 320 and the banded echo residual signal 322, respectively.

At 806, an estimated power gain profile and a loopback power are calculated based on the banded reference signal and the banded echo residual signal. The estimated power gain profile 324 corresponds to an estimate of the power gain profile of an acoustic echo canceller such as the echo canceller 201 (see FIG. 1). For example, the power gain profile estimator 312 (see FIG. 3) may calculate the estimated power gain profile 324 based on the banded reference signal 320 and the banded echo residual signal 322. The loopback power calculator 400 (see FIG. 4) may calculate the loopback power 420 based on the banded reference signal 320. The estimated power gain profile 324 may indicate a long-term amount of echo cancellation as calculated by the loopback power calculator 400, e.g. by using the history of the banded reference signal 320 stored in the memory 412.

At 808, an estimated echo residual power is calculated based on the banded echo residual signal, the loopback power and the estimated power gain profile. For example, the echo residual estimator 313 (see FIG. 3) may calculate the estimated echo residual power 328 based on the banded echo residual signal 322, the loopback power 420 and the estimated power gain profile 324.

At 810, a plurality of banded gains are calculated based on the banded echo residual signal and the estimated echo residual power. For example, the gain calculator 314 (see FIG. 3) may calculate the banded gains 330 based on the banded echo residual signal 322 and the estimated echo residual power 328.

At 812, a modified echo residual signal is generated by applying the plurality of banded gains to the echo residual signal. For example, the signal combiner 310 (see FIG. 3) may generate the modified echo residual signal 150 by applying the banded gains 330 to the echo residual signal 140.

The method 800 may include additional steps corresponding to the other functionalities of the echo management system 100, the echo canceller 201, the echo suppressor 301, the loopback power calculator 400, etc. as described herein. For example, the reference signal may be outputted by a loudspeaker, such as the loudspeakers 704 (see FIG. 7). As another example, near end audio may be captured by a microphone (e.g., the microphone 705 of FIG. 5), a near end audio signal may be generated, and the echo residual signal may be generated by performing echo cancellation on the near end audio signal (e.g., by the echo canceller 201 of FIG. 1). The near end audio may include local talk (e.g., speech generated by the near end person), echo (e.g., the far end speech outputted by the loudspeaker at the near end), etc. As another example, the modified echo residual may be transmitted by the near end device to a far end device, e.g. as part of a teleconference, a videoconference, etc.

Implementation Details

An embodiment may be implemented in hardware, executable modules stored on a computer readable medium, or a combination of both (e.g., programmable logic arrays). Unless otherwise specified, the steps executed by embodiments need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, embodiments may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible or transitory signals are excluded to the extent that they are unpatentable subject matter.)

Aspects of the systems described herein may be implemented in an appropriate computer-based sound processing network environment for processing digital or digitized audio files. Portions of the adaptive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof.

One or more of the components, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

REFERENCES

U.S. Pat. Nos. 10,115,411; 8,111,833; 9,338,551; 9,363,600; 10,382,092; 10,313,789; 10,477,031; 9,503,815; 9,185,506; 8,462,958; 6,163,608; 9,420,390; 9,173,025; 8,712,076; 8,804,977.

U.S. Patent Application Pub. Nos. 2016/0241955; 2019/0349471.

C. Yemdji, M. M. Idrissa, N. W. D. Evans and C. Beaugeant, "Efficient low delay filtering for residual echo suppression", in 2010 18th European Signal Processing Conference, Aalborg, 2010, pp. 16-20.

What is claimed is:

1. A computer-implemented method of audio processing, the method comprising:
    receiving a reference signal and an echo residual signal;
    generating a banded reference signal and a banded echo residual signal by performing frequency banding on the reference signal and the echo residual signal, respectively;
    calculating an estimated power gain profile of an acoustic echo canceller and a loopback power based on the banded reference signal and the banded echo residual signal, wherein the loopback power corresponds to a combination of historical values of the banded reference signal, and wherein the loopback power is based on a plurality of dominant taps of a plurality of adaptive filters;
    calculating an estimated echo residual power based on the banded echo residual signal, the loopback power and the estimated power gain profile;
    calculating a plurality of banded gains based on the banded echo residual signal and the estimated echo residual power; and
    generating a modified echo residual signal by applying the plurality of banded gains to the echo residual signal.

2. The method of claim 1, further comprising:
    outputting, by a loudspeaker, the reference signal.

3. The method of claim 1, further comprising:
    capturing, by a microphone, near end audio;
    generating a near end audio signal corresponding to the near end audio; and
    generating the echo residual signal by performing echo cancellation on the near end audio signal.

4. The method of claim 1, further comprising:
    transmitting, to a far end device, the modified echo residual signal.

5. The method of claim 1, wherein the echo residual signal has a plurality of frequency bins, wherein the banded echo residual signal has a plurality of frequency bands, and wherein generating the banded echo residual signal comprises:
    generating the banded echo residual signal by performing equivalent rectangular bandwidth banding on the echo residual signal, wherein the equivalent rectangular banding aggregates the plurality of frequency bins into the plurality of frequency bands according to a psychoacoustic model of human hearing.

6. The method of claim 1, wherein calculating the estimated power gain profile includes:
    calculating, by a dominant adaptive filter tap finder, the plurality of dominant taps of the plurality of adaptive filters, wherein the plurality of dominant taps provide a greater weight contribution to the plurality of adaptive filters as compared to other taps of the plurality of adaptive filters;
    calculating the loopback power of the banded reference signal using two dominant taps of the plurality of dominant taps and a history of the banded reference signal; and
    calculating the estimated power gain profile using a histogram based on the banded reference signal.

7. The method of claim 6, wherein the estimated power gain profile includes a mean and a variance.

8. The method of claim 1, wherein the loopback power is calculated over a plurality of bands, wherein calculating the estimated echo residual power includes:
    calculating the estimated echo residual power according to the loopback power for each band of the plurality of bands by modeling the power gain of an echo canceller for each band as a Gaussian random variable parameterized by the estimated power gain profile.

9. The method of claim 1, wherein calculating the plurality of banded gains includes selectively calculating the plurality of banded gains based on a likelihood of local talk in the echo residual signal, wherein the local talk corresponds to audio captured by a device that implements the method of claim 1.

10. The method of claim 9, wherein the likelihood of local talk in the echo residual signal is calculated by modeling the echo residual signal as a Gaussian mixture model applied over a plurality of bands.

11. The method of claim 9, wherein the likelihood of local talk in the echo residual signal is a log likelihood based on a mean and a variance of the estimated power gain profile summed over a plurality of frequency bands.

12. The method of claim 9, wherein calculating the plurality of banded gains includes calculating a global maximum suppression gain across the plurality of frequency bands.

13. The method of claim 12, wherein calculating the global maximum suppression gain is based on a first gain corresponding to a presence of the local talk, a second gain corresponding to an absence of the local talk, and the likelihood of the local talk.

14. The method of claim 1, wherein the echo residual signal has a plurality of frequency bins, wherein a given banded gain of the plurality of banded gains corresponds to a given frequency bin of the plurality of frequency bins, and wherein generating the modified echo residual signal includes:

for each of the plurality of frequency bins of the echo residual signal, applying a corresponding banded gain of the plurality of banded gains to generate the modified echo residual signal.

15. A non-transitory computer readable medium storing a computer program that, when executed by a processor, controls an apparatus to execute processing including the method of claim 1.

16. An apparatus for audio processing, the apparatus comprising:
a processor; and
a non-transitory computer readable medium storing a computer program that, when executed by a processor, causes the apparatus to perform operations of claim 1.

17. The apparatus of claim 16, further comprising:
a loudspeaker that is configured to output the reference signal.

18. The apparatus of claim 16, further comprising:
a microphone that is configured to capture near end audio, wherein the processor is configured to control the apparatus to generate a near end audio signal corresponding to the near end audio, and
wherein the processor is configured to control the apparatus to generate the echo residual signal by performing echo cancellation on the near end audio signal.

19. The apparatus of claim 16, wherein the apparatus is configured to transmit, to a far end device, the modified echo residual signal.

20. The apparatus of claim 16, wherein the loopback power is calculated over a plurality of bands; and
wherein the processor is configured to control the apparatus to calculate the estimated echo residual power according to the loopback power for each band of the plurality of bands by modeling the power gain of an echo canceller for each band as a Gaussian random variable parameterized by the estimated power gain profile.

* * * * *